United States Patent
Paquette et al.

(10) Patent No.: US 7,562,362 B1
(45) Date of Patent: Jul. 14, 2009

(54) USER CONTROL OF TASK PRIORITY

(75) Inventors: Michael J Paquette, Benicia, CA (US); Joseph Sokol, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 927 days.

(21) Appl. No.: 10/465,456

(22) Filed: Jun. 18, 2003

(51) Int. Cl.
G06F 9/46 (2006.01)
G06F 11/00 (2006.01)

(52) U.S. Cl. ...................... 718/102; 714/100
(58) Field of Classification Search ............ 718/102; 714/699, 100
See application file for complete search history.

(56) References Cited

U.S. PATENT DOCUMENTS 4,389,706 A * 6/1983 Gomola et al. .............. 700/1
6,721,615 B2 * 4/2004 Fava et al. .................. 700/99
7,155,716 B2 * 12/2006 Hooman et al. ............ 718/102
2006/0037025 A1 * 2/2006 Janssen et al. ............. 718/107

OTHER PUBLICATIONS

Mechanism for Timing Error Detection and Handling David B. Stewart and P.K. Khosla ACM, v. 40, n. 1, Jan. 1997.*

* cited by examiner

Primary Examiner—Meng-Ai An
Assistant Examiner—Mengyao Zhe
(74) Attorney, Agent, or Firm—Fenwick & West LLP

(57) ABSTRACT

In response to user action, lower priority tasks are scheduled as high priority tasks. This allows lower priority tasks to function even if a higher priority task has malfunctioned and starved the lower priority tasks of instructions. This advantageously provides the user with increased abilities to solve or work around malfunctioning tasks.

62 Claims, 6 Drawing Sheets

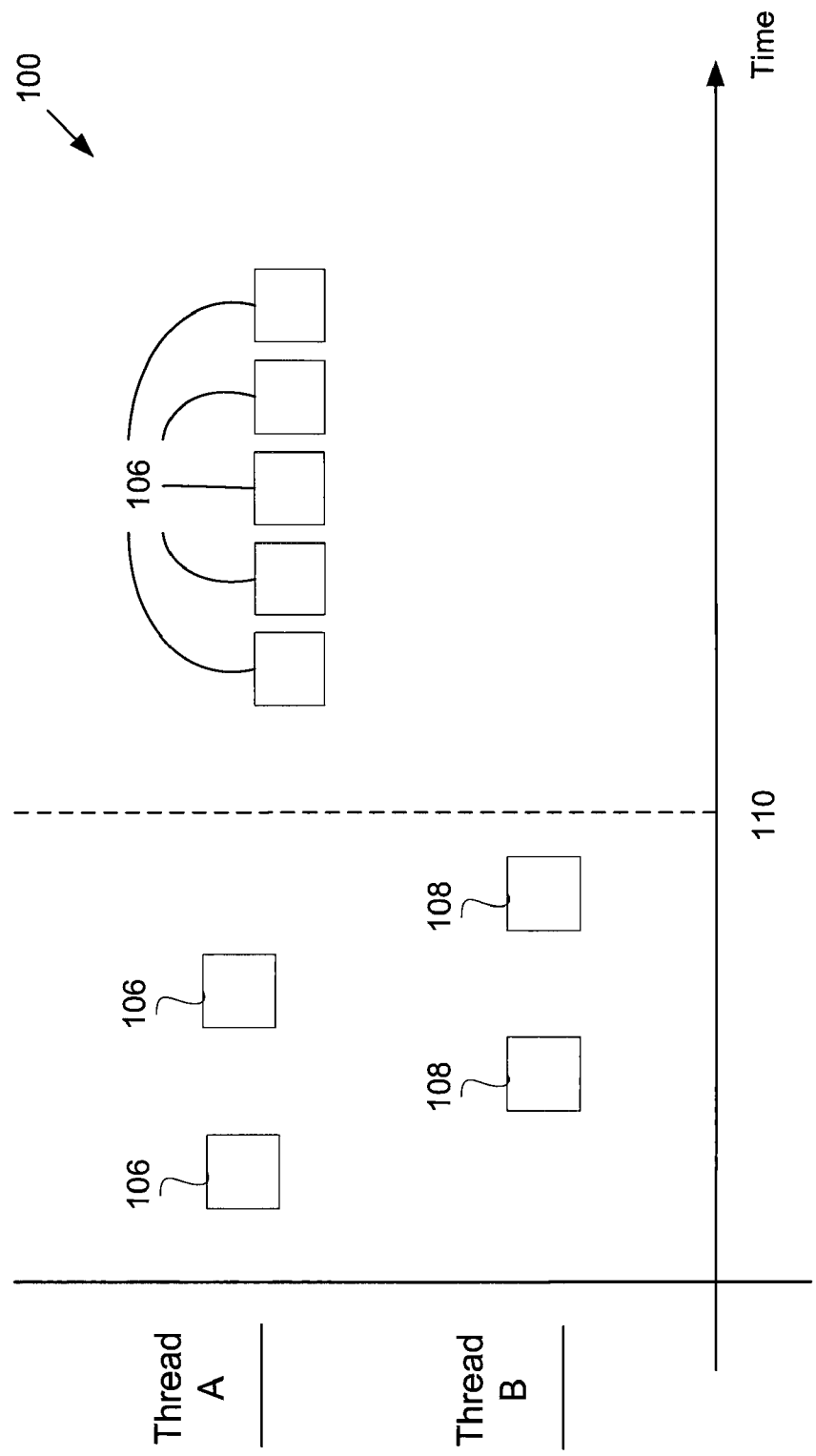

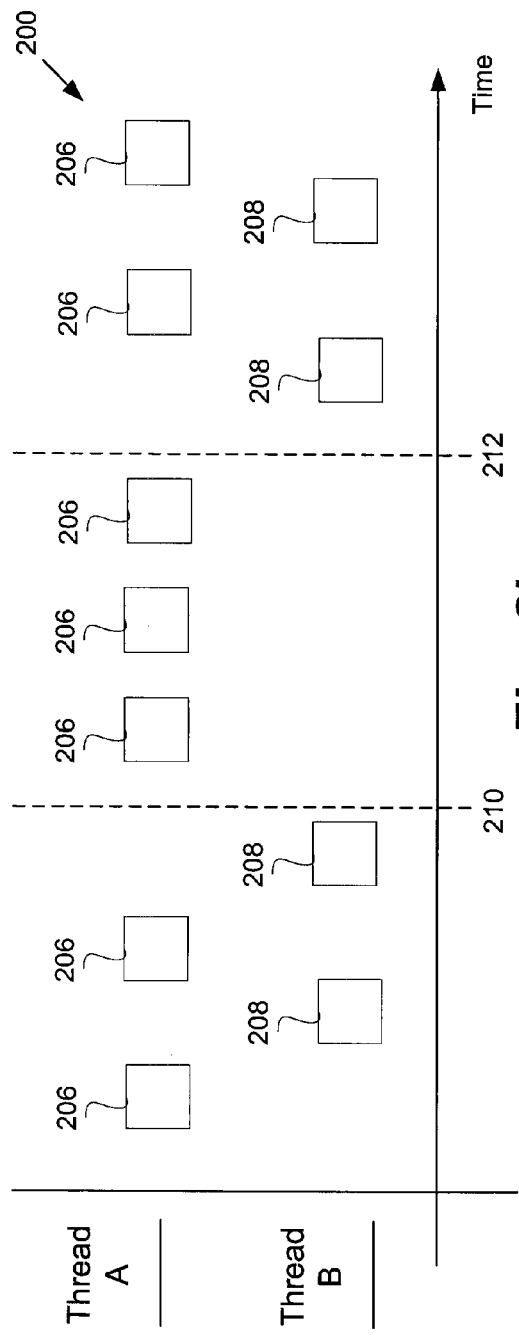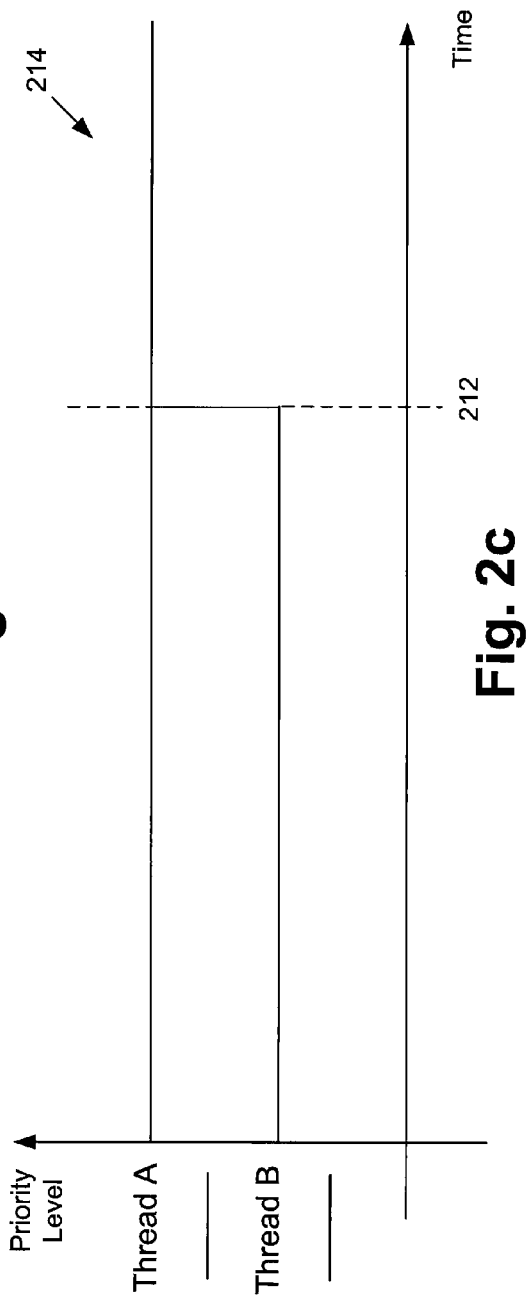

USER CONTROL OF TASK PRIORITY

BACKGROUND

1. Field of the Invention

This invention relates to computer systems, and more particularly to user control of priority of tasks performed by a computer system.

2. Background of the Invention

Many modern processors execute multiple tasks at once. Processors execute these tasks at varying levels of priority, with instructions of higher priority tasks being preferentially executed over instructions of lower priority tasks. In normal operation, the higher priority tasks do not require all of the instructions executed by the processor. There are sufficient instructions available to correctly execute the lower priority tasks. This means that both high priority and low priority tasks are performed correctly.

For example, a higher priority task may be a music playback program and a lower priority task may be a word processing program, both running on the same computer. The music program has a higher priority because it requires a certain rate of instructions to be executed to output the music correctly. If the music program were low priority and had to wait for instructions not used by a higher priority task, there could be pauses in the music or other problems with music playback. Such pauses would mean unacceptable playback quality. In contrast, it is acceptable for a word processing program to have a lower priority because short time periods when it pauses while waiting for processing time not used by higher priority tasks have minimal effect on the functionality of the program. A music program with repeated short pauses would be unusable, but a word processing program with those same short pauses could still function correctly.

FIG. 1 is a timing diagram 100 showing how a higher priority task and a lower priority task are executed, and a problem that can occur. Thread A is a higher priority task, the music playback program in the example above. Thread B is a lower priority task, the word processing program in the example above. In FIG. 1, at first both threads A, B are being executed. Instructions 106 for thread A are executed as needed, and any remaining processing cycles of the processor are made available for instructions 108 of thread B. Even though thread A has higher priority, it does not require all the processing cycles of the processor. The processor can also execute instructions 108 for thread B. Thus, both threads function correctly.

However, at time 110 an event occurs that causes thread A to request and use all the processing cycles of the processor. This could be caused by a malfunction or "bug" in thread A. Thus, after time 110 only instructions 106 of thread A are executed. No instructions 108 for thread B are executed; thread B is "starved" of processing cycles. This causes problems for the user. In the example above, the lower priority word processing program would no longer function. Typically, user interface functions, such as the drawing of windows on a screen, are also a lower priority. This means that it appears to the user that the word processing program, as well as the computer in general, has frozen and completely stopped functioning.

To return the computer to normal operation, the user stops the malfunctioning task from using all the instructions executed by the processor. One conventional way users stop the malfunctioning task from using all the instructions executed by the processor is to send a hardware interrupt to the processor. For example, in the Windows operating system, the user presses the "ctrl-alt-delete" keys simultaneously to send a hardware interrupt. In response to this hardware interrupt, the tasks that were running are interrupted and special software, a "task manager," is run that presents the user with options with which to correct the problem. For example, the user may end the task that is causing the problem. By ending the task, other lower priority tasks would then be executed correctly.

However, such conventional solutions have problems. Because the hardware interrupt stops the tasks that were being executed at an arbitrary time in response to the user command, the state of the processor, related memory, and tasks being executed by the processor are unknown. In such a state, it would be easy to cause problems, such as corrupting data structures, if normal software processes were then executed. To avoid such problems, the software that runs in response to the hardware interrupt provides only limited functionality. For example, it allows the user to end the malfunctioning task. However, because of the danger of corrupting data structures and causing other problems, the software that runs in response to the hardware interrupted does not allow the user to perform many other actions that would be helpful to diagnose or correct the problem, or minimize damage from the problem. Further, the "ctrl-alt-delete" interrupt is hard-coded into the computer's BIOS and hardware, and as such cannot be reprogrammed by either the user or the applications developer to invoke other functionality.

Accordingly, it is desirable to provide a mechanism for a user to work around malfunctioning high priority tasks with more flexibility than conventional mechanisms.

SUMMARY OF THE INVENTION

The invention raises the priority of tasks in response to a user action, typically when a high priority task malfunctions and "starves" other tasks of instructions. By raising the priority of tasks, they are scheduled for instructions in a round robin or other scheduling algorithm in turn with the malfunctioning high priority task. This allows proper function of the tasks that were raised in priority to avoid being starved of instructions.

In one embodiment, a predetermined list of tasks to be raised in priority is stored in a task list. When a user enters a predetermined command to raise task priority, the tasks in the task list are scheduled as high priority tasks. Depending on what tasks have been stored in the list, the user may then diagnose or report the problem, save data to avoid it being lost, perform task repair operations, or perform other operations. Alternatively, various troubleshooting actions are automatically performed by a system in response to a user command to raise task priority. These automatic actions may include executing a diagnostic and repair application or other actions. After a predetermined time, the tasks that have been raised in priority may be returned to their previous priority level, and normal operation of the system resumed.

In another embodiment, some tasks to be raised in priority in response to a user action are stored in a list. When these tasks are raised in priority in response to user action, they are capable of causing other tasks to be raised in priority. When a task that has been raised in priority makes a call to another task, the other task is automatically scheduled as a higher priority task as well. This allows any task that is desired to be raised to high priority, and does not limit the proper functioning of tasks to those in a predetermined list, providing extra flexibility to the actions that may be performed when a high priority task malfunctions.

Advantageously, because the present invention solves the problem of malfunctioning tasks by raising task priority, many or all functions of the system are available to the user, including the normal user interface, and there is no extra danger of causing such problems as corrupting data structures. This allows the user to better solve or work around malfunctions.

BRIEF DESCRIPTION OF THE DRAWINGS

FIG. 1 is a timing diagram showing how a higher priority task and a lower priority task are executed, and a problem that can occur.

FIGS. 2a-2c provide an overview of the benefits of user control over task priority.

DETAILED DESCRIPTION OF THE PREFERRED EMBODIMENTS

Figure 2A:
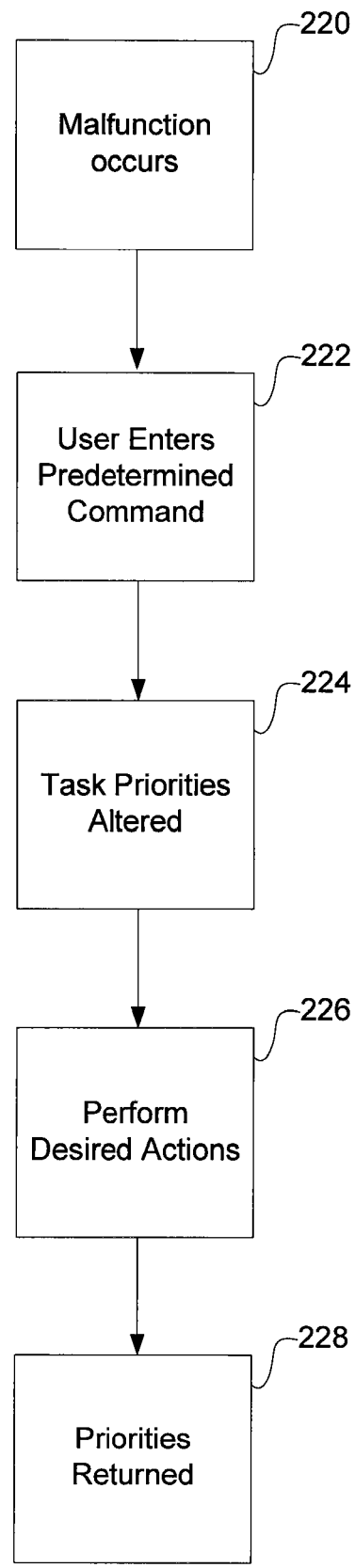

FIGS. 2a-2c provide an overview of the benefits of user control over task priority. FIG. 2a is a flow chart that illustrates what happens when a malfunction in a high-priority task occurs and how user control over task priority is useful to correct the malfunction, or minimize its damage. First, a malfunction occurs 220 with a high priority task. This malfunction causes a processor to execute instructions of that high priority task to the exclusion of executing instructions for lower priority tasks. This "starves" the lower priority tasks and prevents them from being executed. For example, one lower priority task may be a user interface (UI) services application. When a UI services application is not executed, the user interface for a computer does not function, making it appear to a user that the computer has "frozen" and completely stopped operating, even though the high priority task may still be executing in the background.

FIGS. 2b and 2c are timing diagrams 200, 214 showing how a higher priority task being executed by thread A and a lower priority task being executed by thread B are executed normally, and how the tasks are executed when a problem or malfunction occurs. FIGS. 2b and 2c also illustrate how that problem is addressed in one embodiment of the present invention. Since two threads perform the tasks, thread A and thread B, much of the discussion below discusses the threads, rather than the tasks. Thread A initially has a higher priority than thread B, as shown in FIG. 2c. A higher priority level means that if both threads compete for processor resources, the higher priority thread will receive them.

At first, both threads are being executed normally, as shown to the left of time 210 in FIG. 2b. During normal execution, instructions 206 of thread A and instructions 208 of thread B are executed in turn. At time 210, the malfunction occurs 220 with the high priority task: there is a problem with thread A. After the problem, thread A requests all the available processing power. Since thread A has a higher priority than thread B, this results in only instructions for thread A being executed, and no instructions for thread B being executed. As described above with respect to FIGS. 1 and 2a, this can result in the freezing of the program of which thread B is a part, as well as the appearance of a completely frozen computer.

Returning to FIG. 2a, the user notices that there has been a malfunction. The threads are not both being executed correctly. The user may notice that a software program is not executing correctly, or that the computer is frozen, as described above. The user may then enter 222 a predetermined command. This predetermined command causes alteration 224 of task priorities.

Returning to FIGS. 2b and 2c, the user enters 222 the predetermined command at time 212. In response to the predetermined command, the priority of thread B is altered 224, in this case elevated, as shown in FIG. 2c. Thus, at time 212, thread B is no longer lower priority than thread A. While a higher priority thread can use all or most of the cycles executed by processor, this is not typically true when two threads are of the same priority level. Threads of the same priority level typically have instructions executed by the processor in a round-robin or similar schedule. Because thread B has been elevated to the same priority as thread A, and instructions of threads of the same priority are typically executed in a round-robin schedule, instructions 206, 208 of both thread B and thread A are executed after time 212, as shown in FIG. 2b. In another embodiment, the malfunctioning task is lowered in priority. In yet another embodiment, an additional thread may run at a high priority that monitors the execution of other threads and may automatically initiate procedures to allow user control of task priority, or may modify priority of tasks automatically.

Thus, if thread B is a word processing program as discussed in the example of FIG. 1 above, even if thread A malfunctions, it is possible for a user to cause the word processing program to work correctly by altering 224 the priority of threads. Further, additional threads, such as user interface threads, can be elevated in priority just as thread B is, either automatically or through user commands. This means that the problems caused by a malfunction in thread A to other threads can be rectified. Additionally, since after raising the priority of thread B malfunctioning thread A is still running it is possible for the user or technical support to determine what has gone wrong with thread A, correct the problem, and/or reduce future problems. In one embodiment, thread B returns to its original priority level after a predetermined time.

Returning again to FIG. 2a, after the task priorities have been altered 224, the user may perform 226 other desired actions. For example, if thread B is a word processing program, the user may save an open document. The user may then shut down or reboot the system without fear of information entered in the word processing program being lost. The user may also enter other commands to lower the priority of the malfunctioning task, to quit the malfunctioning task, to attempt to determine the cause of the malfunction, to record the malfunction for later technical support, or perform 226 other desired actions. In some embodiments, these actions may be aided by a repair application that eases task priority management, and/or automatically repairs or troubleshoots the problem. As an alternative or in addition to performing 226 other desired actions, predetermined troubleshooting actions may also be performed automatically.

After the user has performed 226 desired actions, the priorities of tasks are returned 228 to their normal level, in one embodiment. This may occur after the problem with malfunctioning application has been repaired, or the malfunctioning application has been ended, to prevent it from again starving other applications for instructions. Alternatively, the priorities of tasks may be returned 228 to their normal level after a preselected time has passed. Returning 228 task priorities to their normal level returns the system to its normal operation.

Figure 3:
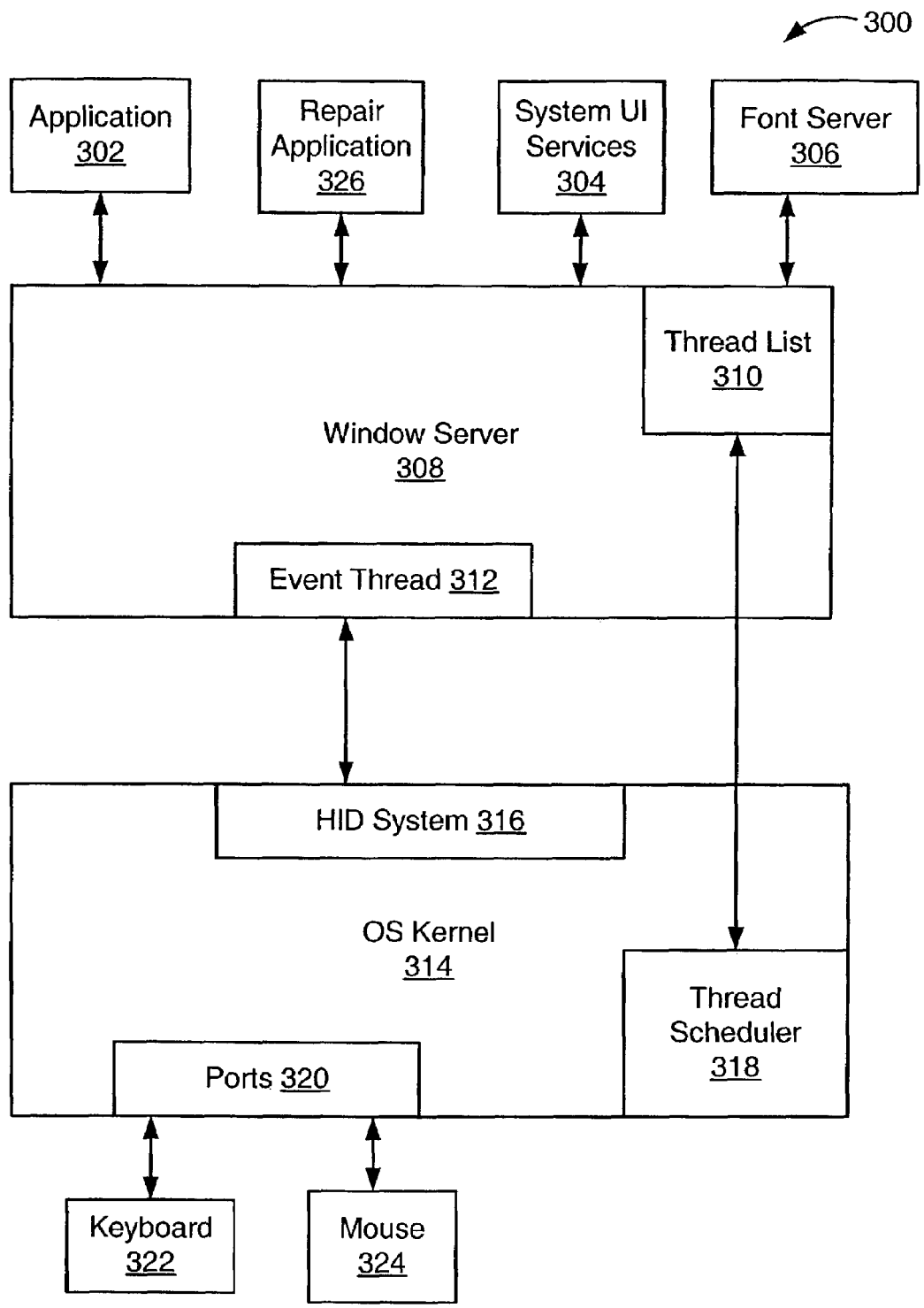
FIG. 3 is a block diagram of a system for providing user control of thread priority according to one embodiment of the present invention.

FIG. 3 is a block diagram of a system 300 for providing user control of thread priority according to one embodiment of the present invention. The system 300 is part of a computer system, such as a personal computer system. The system 300 includes an operating system kernel 314. The operating system kernel 314 is a part of the operating system that typically remains in main memory, and provides services for the rest of the operating system and other programs, including managing memory and task management. The operating system kernel 314 includes connections to ports 320 for receiving user input from user input devices. The ports 320 may be universal serial bus (USB) ports, Apple desktop bus (ADB) ports, or other types of ports 320. The input is received in the form of interrupts, such as signals from typing on a keyboard 322 or other user input devices. As illustrated, these user input devices include a keyboard 322 and a mouse 324, although other user input devices could also be used. The input received from the ports 320 from the user input devices are sent to the human interface device (HID) system 316 within the operating system kernel 314. The HID system 316 allows user input to be properly routed and used by the system 300. The HID system 316 receives the input from the ports 320, identifies whether they are different types of events, and if so, passes the identified events to an event thread module 312.

The event thread module 312 is part of a window server 308. The window server 308 controls the drawing and content of windows to be displayed on the video output screen on behalf of programs running on the computer. Some threads of the window server 308 may have a low priority so that the computer appears frozen to the user, while other threads of the window server 308 may have a high priority. The event thread module 312 receives events, processes them to determine the program for which the event is meant, and sends the event to the correct program. There are one or more programs, or applications, that are connected to the window server 308 and the event thread module 312. In the illustrated embodiment, the programs that are connected to the event thread module 312 include the system user interface (UI) services application 304, the font server application 306, the repair application 326, and other applications 302.

The UI services application 304 controls the user interface presented to the user. This includes UI aspects such as sound volume, screen brightness, and other aspects. If instructions of the UI services application 304 are not being executed, the computer will appear to have "frozen" to the user. The font server application 306 is another application that helps provide the user interface to the user. The font server application 306 provides fonts for use in the user interface windows of other applications. The repair application 326 is an application that allows the user to enter commands to diagnose or repair the malfunction. For example, the repair application 326 can allow the user to examine files, save information to prevent its loss during troubleshooting, change the priority of applications or threads to temporarily stop the instruction starvation and allow completion of tasks, stop execution of an application or thread, and perform other actions. Thus, this repair application 326 may provide an easy way for the user to diagnose, record, or report the malfunction, end the malfunctioning thread, lower the priority of the malfunctioning thread, and/or perform other troubleshooting actions. Alternatively, the repair application 326 may automatically repair the malfunctioning thread or perform other troubleshooting actions.

When task priority is altered, tasks being executed are not arbitrarily stopped, so the state of the processor, related memory, and tasks being executed by the processor remains known. Thus, after altering the task priority to avoid "freezing" the computer, the user has access to full functionality of the computer system without extra danger of corrupting data structures or causing other problems that could occur if the state of the processor, related memory, and tasks being executed were unknown. This allows the user to perform such actions as saving data, changing task priority to allow lower priority tasks to function correctly, investigate the cause of the malfunction, and other actions, providing much more freedom to perform actions and avoid problems than the prior art.

The system 300 also includes a thread list 310. In one embodiment, the thread list 310 is within the window server 308, while in other embodiments, the thread list 310 is stored in a thread scheduler 318 or another location rather than in the window server 308. In one embodiment, the thread list 310 stores a preselected list of threads that are to be elevated in priority in response to user input requesting such priority elevation. In another embodiment, the thread list 310 stores a list of threads that a user has caused to be elevated in priority, or that have automatically been elevated in priority but were not preselected. In yet another embodiment, the thread list 310 stores both a preselected list of threads and additional threads elevated in priority either automatically or by a user.

The thread list 310 can communicate with the thread scheduler 318 in the operating system kernel 314. The thread scheduler 318 schedules instructions from threads to be executed and thus determines how threads are executed. The thread scheduler 318 preferentially schedules higher priority threads over lower priority threads. The thread scheduler 318 is capable of receiving instructions to schedule threads that are normally low priority as if they are high priority threads. High priority threads are typically executed according to a "round robin" schedule, where instructions from each high priority thread are executed in turn.

Figure 4:
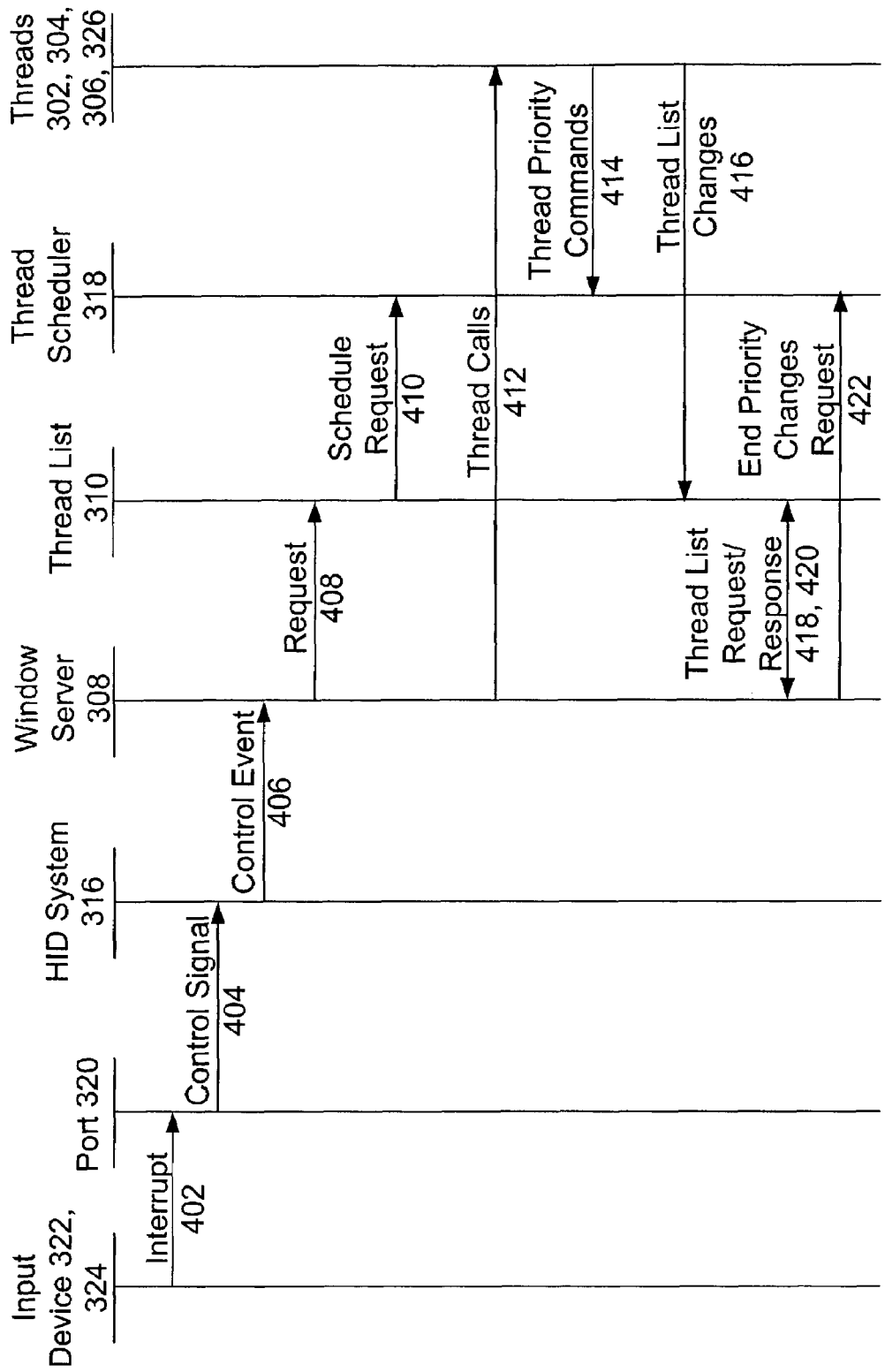
FIGS. 4 and 5 are event diagrams that illustrate how the components described with respect to FIG. 3 operate together to allow user control of task priority.

FIG. 4 is an event diagram that illustrates how the components described above with respect to FIG. 3 operate together to allow user control of task priority. In a first embodiment, the input device, such as a mouse 324, keyboard 322, or other input device, sends an interrupt, known as a user control interrupt 402 to a port 320 in response to a predetermined user action. This user control interrupt 402 initiates actions that allow the user control of task priority. The user action that prompts generation of the user control interrupt 402 sent to the port 320 can be arbitrarily predetermined. For example, any combination of keystrokes on the keyboard 322 could be used as the predetermined user action. Other input devices, or even a dedicated "task priority" input device can also be used to generate the user control interrupt 402.

The port 320 to which the input device is connected receives the user control interrupt 402. The user control interrupt 402 causes the port 320 to which the input device is connected to send a signal 404, referred to as a user control signal 404, to the HID system 316 of the OS Kernel 314. The HID 316 receives the user control signal 404, recognizes the signal 404 as a user control event 406, and sends notification of the user control event 406 to the event thread module 312 in the window server 308. Events, as well as the event thread module 312, have a high priority. The high priority of the event means that even if a high priority task has starved lower priority tasks and prevented them from functioning correctly, the user control event 406 is processed correctly.

The user control event 406 causes the event thread module 312 of the window server 308 to send a request 408 to the thread list 310 to elevate the priority of the threads stored in the thread list 310. The thread list 310 then sends a scheduling request signal 410 to the thread scheduler 318 to elevate to high priority the threads in the thread list 310. This means that instructions of the threads in the thread list 310 will be executed, and not be starved of instructions by a malfunctioning high priority thread. In another embodiment, the window server 308 may receive the list of threads to be elevated in priority from the thread list 310 and send the scheduling request signal 410 in addition to the list of threads to be elevated in priority to the thread scheduler 318. Alternatively, the window server 308 may send the scheduling request signal 410 to the thread scheduler 318 and the thread list 310 send the list of threads to be elevated in priority to the thread scheduler 318. Alternatively, the malfunctioning thread may be lowered in priority.

In one embodiment, the thread list 310 includes a predetermined list of threads that will be elevated in priority in response to the predetermined user action. These threads allow the user to perform actions such as diagnosing the problem with the malfunctioning thread and saving data in open applications. The thread list 310 may include a set list of threads that are always elevated in priority, such as threads that allow the user to diagnose the problem with the malfunctioning thread. The thread list 310 may also include threads that are dynamically determined. For example, when a user opens an application, threads related to that application may be added to the thread list 310 so that the application continues to function correctly, and the user can save data in case of malfunction.

In one example of this embodiment, the threads in the thread list 310 include lower priority threads of the window server 308, the UI services application 304, applications used by the UI services application 304 such as the font server application 306, and other threads that have been predetermined to contribute to allowing the user to correct the problem. By elevating the priority of these threads, the window server 308 is able to correctly function to display windows on the video output screen so that the computer is no longer frozen. Depending on what threads are included in the thread list 310, the user may have full or partial functionality of the computer.

The window server 308 may make calls 412 to the threads in the thread list 310. These calls may be to applications such as system UI services 304, the font server 306, a repair application 326, and/or other applications 302. The calls may result from threads already running in the system 300, the window server 308 may automatically make a call 412 to the threads such as the repair application 326 to aid the user in correcting the malfunctioning thread, or the calls may be made in response to further user actions.

After the threads have been elevated in priority, the user may issue additional commands to elevate or decrease the priority level of threads. Such commands may be entered using the repair application 326 or through other methods. In response to such user commands, the threads 302, 304, 306, and/or 326 can send thread priority commands 414 to the thread scheduler 318. These commands 414 cause the thread scheduler to elevate or decrease the priority levels of the relevant threads and to schedule the relevant threads differently according to that thread's new priority level. The threads 302, 304, 306, and/or 326 may send thread list changes 416 indicating what changes have been made to the priority of other threads to the thread list 310 or other storage so that a record is kept of what threads have had their priority altered.

Optionally, the priority changes to threads may end, and the priorities of tasks returned to their normal level. As discussed above, this may occur after a predetermined time period, in response to user command after the problem with the malfunctioning application has been repaired or the malfunctioning application has been ended to prevent it from again starving other applications for instructions, or at another time. In one embodiment, the window server 308 sends a thread list request 418 to the thread list 310 and receives in response 420 the list of threads that have had their priorities changed to the thread scheduler 318. The thread list 310 also stores the original priority levels of the threads that have had their priority altered. The response 420 also includes the original priority levels. The window server 308 then sends an end priority changes request 422 to the thread scheduler 318, along with the list of threads that have had their priorities changed and the original priorities of those threads. Alternatively, the original priorities may be stored by the thread scheduler 318 or elsewhere. The thread scheduler 318 then returns the priorities of the threads with altered priorities to their original priorities.

Figure 5:
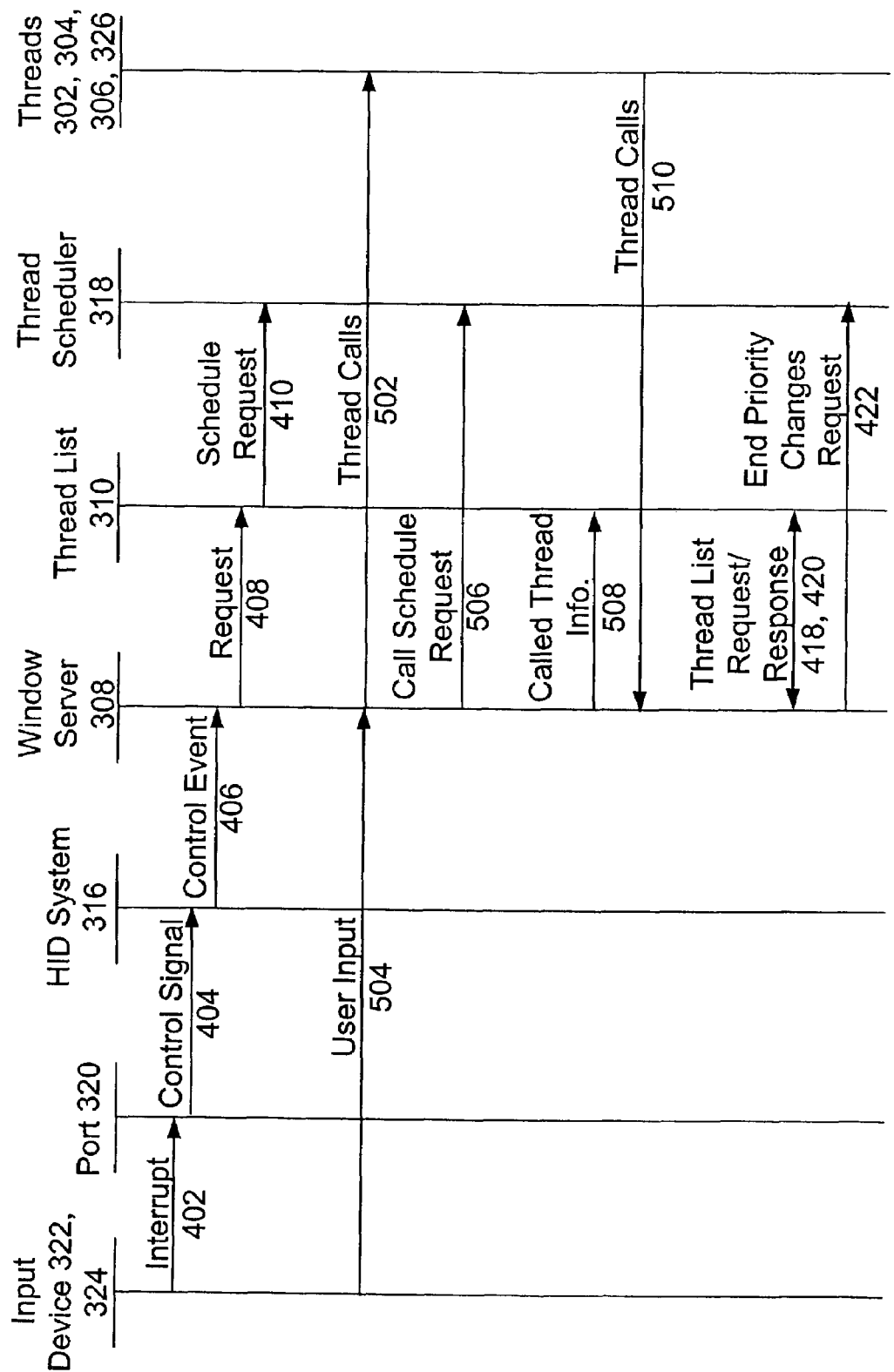

FIG. 5 is an event diagram that illustrates how the components described above with respect to FIG. 3 operate together to allow user control of task priority in a second embodiment. In the second embodiment, the thread list 310 includes a predetermined list of some threads that will be elevated in priority, but other threads that are called are also elevated in priority as needed. The thread list 310 may include just one or a few threads. As those threads call other threads, the called threads are boosted in priority as well. This allows any threads that are needed to be boosted in priority, without boosting priority of threads that are not used.

Similar to the first embodiment, in the second embodiment the input device, such as a mouse 324, keyboard 322, or other input device, sends an interrupt, known as a user control interrupt 402 to a port 320 in response to the predetermined user action. This user control interrupt 402 initiates actions that allow the user control of task priority. The user action that prompts generation of the user control interrupt 402 sent to the port 320 can be arbitrarily predetermined. For example, any combination of keystrokes on the keyboard 322 could be used as the predetermined user action. Other input devices, or even a dedicated "task priority" input device can also be used to generate the user control interrupt 402.

The port 320 to which the input device is connected receives the user control interrupt 402. The user control interrupt 402 causes the port 320 to which the input device is connected to send a signal 404, referred to as a user control signal 404, to the HID system 316 of the OS Kernel 314. The HID 316 receives the user control signal 404, recognizes the signal 404 as a user control event 406, and sends notification of the user control event 406 to the event thread module 312 in the window server 308. Events, as well as the event thread module 312, have a high priority. The high priority of the event means that even if a high priority task has starved lower priority tasks and prevented them from functioning correctly, the user control event 406 is processed correctly.

The user control event 406 causes the event thread module 312 of the window server 308 to send a request 408 to the thread list 310 to elevate the priority of the threads stored in the thread list 310. The thread list 310 then sends a scheduling request signal 410 to the thread scheduler 318 to elevate to high priority the threads in the thread list 310. In one example of this second embodiment, the thread list 310 only includes a few threads or a single thread. For example, the thread list 310 may include only the thread of the window server 308. This means that instructions of the window server 308 thread will be executed, and not be starved of instructions by a malfunctioning high priority thread.

The window server 308 thread that has been raised in priority makes thread calls 502 to other threads and applications 302, 304, 306, 326. These calls may be initiated through the normal operation of the window server 308, by the window server 308 receiving further user inputs 504 from the input devices 322, 324 via the ports 320 and HID system 316, or through other methods. When the window server 308 makes a thread call 502, the window server 308 also makes a call schedule request 506 to the thread scheduler 318. This causes the thread scheduler 318 to increase the priority of the thread that has been called, so that the called thread will operate correctly. Optionally, the window server 308 also sends call information 508 about which thread has been called to the thread list 310 so that the thread list 310 may store what threads have been raised in priority.

The threads and applications 302, 304, 306, 326 that have been called in turn may make further calls 510 to additional threads and applications 302, 304, 306, 326. When this occurs, the calls 510 of the threads and applications 302, 304, 306, 326 are sent to the window server 308, which in response sends additional call schedule requests 506 to the thread scheduler 318 so that the thread scheduler 318 will increase the priority of the called threads and applications 302, 304, 306, 326. The window server 308 optionally also sends call information 508 about which thread has been called to the thread list 310 so that the thread list 310 may store what threads have been raised in priority.

Just as in the first embodiment, in the second embodiment the priority changes to threads may optionally end, and the priorities of tasks returned to their normal level. As discussed above, this may occur after a predetermined time period, in response to user command after the problem with the malfunctioning application has been repaired, or the malfunctioning application has been ended, to prevent it from again starving other applications for instructions, or at another time. In one embodiment, the window server 308 sends a thread list request 418 to the thread list 310 and receives in response 420 the list of threads that have had their priorities changed to the thread scheduler 318. The thread list 310 also stores the original priority levels of the threads that have had their priority altered. The response 420 also includes the original priority levels. The window server 308 then sends an end priority changes request 422 to the thread scheduler 318, along with the list of threads that have had their priorities changed and the original priorities of those threads. Alternatively, the original priorities may be stored by the thread scheduler 318 or elsewhere. The thread scheduler 318 then returns the priorities of the threads with altered priorities to their original priorities.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. Persons skilled in the art will recognize various equivalent combinations and substitutions for various components shown in the figures. It is therefore intended that the scope of the invention be limited not by this detailed description, but rather by the claims appended hereto.

What is claimed is:

1. A computer-implemented method of controlling the operation of computer tasks, comprising:
   executing a first task having a first priority level and a user interface task having a second priority level lower than the first priority level, wherein the first task is associated with a malfunction that increases usage of processing resources by the first task and prevents the user interface task from executing correctly;
   detecting a user input from a user input device, the user input responsive to the malfunction associated with the first task;
   responsive to detecting the user input, elevating the priority level of a predetermined list of executing tasks that includes the user interface task such that the priority level of the predetermined list of executing tasks is at least as high as the priority level of the first task, wherein the predetermined list of executing tasks includes at least one task that allows a user to enter a command that specifies at least one action to resolve the malfunction associated with the first task; and
   responsive to resolving the malfunction, restoring the previous priority levels of the predetermined list of executing tasks.

2. The method of claim 1, wherein the at least one task that allows a user to enter a command that specifies at least one action to resolve the malfunction associated with the first task comprises the user interface task.

3. The method of claim 1, wherein detecting the user input comprises detecting activation of a predetermined key combination.

4. The method of claim 3, wherein the key combination is user-definable.

5. The method of claim 1, further comprising:
   calling, by one of the first task and the user interface task, a third task not listed in the predetermined list of executing tasks to be altered in priority; and
   raising the priority level of the third task such that the priority level of the third task is at least as high as the priority level of the first task.

6. The method of claim 1, further comprising receiving a trigger event indicating that the malfunction has been resolved.

7. The method of claim 6, wherein the trigger event comprises a second user input associated with restoring previous priority levels.

8. The method of claim 1, further comprising executing a priority management task having a priority level at least as high as the priority level of the first task.

9. The method of claim 8, wherein the priority management task accepts user input for altering at least one priority level, and alters at least one priority level as indicated by the user input.

10. The method of claim 8, wherein the priority management task automatically alters the priority level of at least one of the first task and the predetermined list of executing tasks.

11. The method of claim 1, wherein the at least one action specified by the user to resolve the malfunction comprises saving a document.

12. The method of claim 1, wherein resolving the malfunction comprises executing a repair application for resolving an error condition.

13. The method of claim 12, wherein executing a repair application comprises executing a repair application for automatically repairing an error condition associated with the first task.

14. The method of claim 12, wherein executing a repair application comprises executing a repair application for diagnosing an error condition associated with the first task.

15. The method of claim 12, wherein executing a repair application comprises executing a task management application for receiving at least one user command specifying the at least one action to resolve the malfunction.

16. The method of claim 15, wherein the at least one action comprises saving a file.

17. The method of claim 1, wherein elevating the priority level of the predetermined list of executing tasks comprises:
   retrieving a previously stored thread list; and
   elevating the priority level of tasks associated with threads included in the thread list.

18. The method of claim 1, wherein elevating the priority level of the predetermined list of executing tasks comprises:

retrieving a previously stored task list; and
elevating the priority level of tasks included in the task list.

19. The method of claim 18, wherein elevating the priority level of the predetermined list of executing tasks further comprises:
    altering the priority level of at least one task not included in the task list.

20. The method of claim 18, wherein elevating the priority level of the predetermined list of executing tasks further comprises:
    responsive to user action, altering the priority level of at least one task not included in the task list.

21. The method of claim 18, wherein elevating the priority level of the predetermined list of executing tasks further comprises:
    responsive to a task included in the task list calling a task not included in the task list, altering the priority level of the task not included in the task list.

22. The method of claim 1, wherein detecting the user input comprises:
    receiving, at a port, a user control interrupt from an input device;
    transmitting, by the port, a user control signal;
    receiving, by an operating system kernel component, the user control signal;
    transmitting, by the operating system kernel component, an event notification; and
    receiving, by an event thread module, the event notification.

23. The method of claim 1, wherein elevating the priority level of the predetermined list of executing tasks comprises:
    transmitting, by an event thread module, a request to elevate the priority level of the predetermined list of tasks;
    receiving, by a thread list, the request; and
    transmitting, by the thread list, a scheduling request signal to elevate the priority level of the predetermined list of tasks.

24. The method of claim 23, further comprising:
    receiving, by a thread list, at least one signal acknowledging a priority level change.

25. The method of claim 1, further comprising:
    storing a record indicating which task priority levels were altered.

26. The method of claim 1, wherein elevating the priority level of the predetermined list of executing tasks comprises:
    obtaining a dynamically generated thread list; and
    elevating the priority level of tasks associated with threads included in the thread list.

27. A computer program product for controlling the operation of computer tasks, comprising:
    a computer readable medium; and
    computer program code, encoded on the medium, for controlling a processor to perform the operations of:
        executing a first task having a first priority level and a user interface task having a second priority level lower than the first priority level, wherein the first task is associated with a malfunction that increases usage of processing resources by the first task and prevents the user interface task from executing correctly;
        detecting a user input from a user input device, the user input responsive to the malfunction associated with the first task;
        responsive to detecting the user input, elevating the priority level of a predetermined list of executing tasks that includes the user interface task such that the priority level of the predetermined list of executing tasks is at least as high as the priority level of the first task, wherein the predetermined list of executing tasks includes at least one task that allows a user to enter a command that specifies at least one action to resolve the malfunction associated with the first task; and
        responsive to resolving the malfunction, restoring the previous priority levels of the predetermined list of executing tasks.

28. The computer program product of claim 27, wherein the at least one task that allows a user to enter a command that specifies at least one action to resolve the malfunction associated with the first task comprises the user interface task.

29. The computer program product of claim 27, wherein the computer program code for controlling a processor to perform the operation of detecting user input comprises computer program code for controlling a processor to perform the operation of detecting activation of a predetermined key combination.

30. The computer program product of claim 29, wherein the key combination is user-definable.

31. The computer program product of claim 27, wherein computer program code for resolving the malfunction comprises computer program code, encoded on the medium, for controlling a processor to perform the operation of:
    executing a repair application for resolving an error condition.

32. The computer program product of claim 27, wherein the computer program code for controlling a processor to perform the operation of elevating the priority level of the predetermined list of executing tasks comprises computer program code for controlling a processor to perform the operations of:
    retrieving a previously stored thread list; and
    elevating the priority level of tasks associated with threads included in the thread list.

33. The computer program product of claim 27, wherein the computer program code for controlling a processor to perform the operation of elevating the priority level of the predetermined list of executing tasks comprises computer program code for controlling a processor to perform the operations of:
    retrieving a previously stored task list; and
    altering the priority level of tasks included in the task list.

34. In a computer system executing at least a first task having a first priority level and a user interface task having a second priority level lower than the first priority level, a system for controlling the operation of computer tasks, comprising:
    a task scheduler, for executing the first task and the user interface task, wherein the first task is associated with a malfunction that increases usage of processing resources by the first task and prevents the user interface task from executing correctly;
    a port, for detecting a user input from a user input device, the user input responsive to the malfunction associated with the first task, and for sending a signal indicating the user input;
    an event module, for, responsive to the port detecting the user input, sending a signal to the task scheduler indicating an elevated priority level of a predetermined list of executing tasks that includes the user interface task such that the priority level of the predetermined list of executing tasks is at least as high as the priority level of the first task, wherein the predetermined list of executing tasks includes at least one task that allows a user to enter a command that specifies at least one action to resolve the malfunction associated with the first task; and wherein the task scheduler restores the previous priority levels of the predetermined list of executing tasks responsive to the malfunction being resolved.

35. The system of claim 34, wherein the at least one task that allows a user to enter a command that specifies at least one action to resolve the malfunction associated with the first task comprises the user interface task.

36. The system of claim 34, wherein the user input associated with task priority control comprises a predetermined key combination on the input device.

37. The system of claim 36, wherein the key combination is user-definable.

38. The system of claim 34, further comprising:
a repair application, coupled to the event module, for resolving an error condition.

39. The system of claim 34, further comprising a thread list, coupled to the task scheduler;
wherein the task scheduler elevates the priority level of the predetermined list of executing tasks by raising the priority level of tasks associated with threads included in the thread list.

40. The system of claim 34, wherein the task scheduler alters the priority level of at least one task not included in the predetermined list of executing tasks.

41. The system of claim 34, wherein, responsive to user action, the task scheduler alters the priority level of at least one task not included in the predetermined list of executing tasks.

42. The system of claim 34, wherein, responsive to a task included in the predetermined list of executing tasks calling a task not included in the predetermined list of executing tasks, the task scheduler alters the priority level of the task not included in the predetermined list of executing tasks.

43. The system of claim 34, further comprising:
a user input device, for receiving a user input indicative of altering the priority of at least one task and generating a user input signal in response;
wherein the port detects the user input by receiving the user input signal from the user input device, and transmits a user control signal;
the system further comprising an operating system kernel component, for receiving the user control signal from the port and for transmitting an event notification to the event module.

44. The system of claim 34, further comprising:
a thread list, for receiving from the event module a request to alter the priority level of at least one task and for transmitting a scheduling request signal to alter the priority level of at least one task;
wherein the event module transmits to the thread list a request to alter the priority level of at least one task.

45. The system of claim 44, wherein:
the thread list receives at least one signal acknowledging a priority level change.

46. The system of claim 34, further comprising:
a storage device, coupled to the task scheduler, for storing a record indicating which task priority levels were altered.

47. The system of claim 34, further comprising:
a dynamically generated thread list, for receiving from the event module a request to alter the priority level of at least one task and for transmitting a scheduling request signal to alter the priority level of at least one task;
wherein the event module transmits to the thread list a request to alter the priority level of at least one task.

48. The method of claim 6, wherein the trigger event comprises expiration of a predetermined period of time after the user input.

49. The method of claim 6, wherein the trigger event comprises termination of a task.

50. The method of claim 1, wherein the at least one action comprises shutting down.

51. The method of claim 1, wherein the at least one action comprises rebooting.

52. The method of claim 1, wherein the at least one action comprises terminating at least one task.

53. The method of claim 1, wherein the at least one action comprises altering at least one task priority.

54. The method of claim 1, wherein the at least one action comprises outputting diagnostic information associated with the malfunction.

55. The method of claim 1, wherein the at least one action comprises storing diagnostic information associated with the malfunction.

56. The method of claim 1, wherein the at least one action comprises transmitting an alert.

57. The method of claim 15, wherein the at least one action comprises terminating a task.

58. The method of claim 15, wherein the at least one action comprises terminating an application.

59. The method of claim 15, wherein the at least one action comprises changing task priority.

60. The method of claim 15, wherein the at least one action comprises determining a cause of the malfunction.

61. The method of claim 15, wherein the at least one action comprises recording diagnostic information associated with the malfunction.

62. The method of claim 15, wherein the at least one action comprises outputting diagnostic information associated with the malfunction.

* * * * *